United States Patent [19]

Waddington et al.

[11] Patent Number: 5,018,601
[45] Date of Patent: May 28, 1991

[54] INTEGRATED EMERGENCY LUBRICATION SYSTEM HAVING SINGLE FEED LINE TO BEARINGS

[75] Inventors: Clive Waddington, Stratford; George T. Milo, Huntington, both of Conn.

[73] Assignee: Avco Corporation, Providence, R.I.

[21] Appl. No.: 545,359

[22] Filed: Jun. 27, 1990

[51] Int. Cl.[5] ............................................. F01M 1/18
[52] U.S. Cl. .................................. 184/6.4; 184/6.11; 184/6.26
[58] Field of Search ...................... 184/6.1, 6.11, 6.26, 184/6.4, 108, 7.4, 8; 60/39.08; 137/517

[56] References Cited

U.S. PATENT DOCUMENTS

| | | | |
|---|---|---|---|
| 1,896,036 | 1/1933 | Bell | 184/39 |
| 2,667,236 | 1/1954 | Graves | 184/7.4 |
| 3,816,040 | 6/1974 | Janik | 184/7.4 |
| 4,717,000 | 1/1988 | Waddington et al. | 184/6.1 |
| 4,858,644 | 8/1989 | Decker | 137/517 |

*Primary Examiner*—Ira S. Lazarus
*Assistant Examiner*—Alan B. Cariaso
*Attorney, Agent, or Firm*—Perman & Green

[57] ABSTRACT

An integrated emergency lubrication system for lubricating the bearings of a gas turbine engine in the event that the normal lubrication system for the engine fails for any reason. The emergency system includes an accumulator for storing oil, derived from the normal lubrication system, that is released in a controlled manner, mixed with air and supplied, as a mist to lubricate the engine's bearings for several minutes after the normal lubrication system fails. Energy for operating the emergency lubrication system is derived from high pressure compressed air admitted from the compressor section of the engine when the oil pressure of the normal lubrication falls, a portion of the compressed air being pressure-regulated and combined with oil from the accumulator to form an air/oil mist that is sprayed over the bearings to be lubricated. A flow control valve is provided to control the flow of the oil from the accumulator under the influence of high pressure compressed air, for admixture with the regulated air to form the mist. Thus the oil flow rate remains substantially constant independently of the upstream and downstream air pressures and the oil temperatures.

7 Claims, 2 Drawing Sheets

INTEGRATED EMERGENCY LUBRICATION SYSTEM HAVING SINGLE FEED LINE TO BEARINGS

BACKGROUND OF THE INVENTION

Gas turbine engines include numerous bearings, many of them operating at high speed, that require continuous lubrication to preserve the integrity of the engine. Under normal operating conditions, the bearings receive lubrication from the engine's oil supply system. However, if that supply of oil is interrupted, whether due to faulty operation or damage from enemy action as in military aircraft, the bearings would fail almost immediately for lack of lubrication with disastrous consequences. To cope with such situations, it is imperative that an emergency backup system be provided so that the engine can continue to operate safely for a time sufficient to permit its operator to shut down the engine and take steps to protect his own safety.

The invention of our prior U.S. Pat. No. 4,717,000 comprises an integrated emergency lubrication system that provides continuous lubrication for the bearings of a gas turbine engine assuring safe operation at nearly full power for several minutes in the event the engine's main oil supply fails. The emergency system is highly reliable, easily maintained, and relative invulnerable to damage yet can be manufactured at relatively low cost.

However we have found that the emergency lubrication system of said Patent is more complex than is necessary, with resultant additional weight and expense.

In the system of U.S. Pat. No. 4,717,000, the emergency oil supply is forced by regulated, reduced air pressure to the individual bearing sump and gearbox nozzles through an oil supply line to each nozzle, while the regulated air is fed to the individual nozzles through a separate air supply line to each nozzle. The oil and air are mixed and misted at each nozzle, requiring separate oil and air lines to each gearbox. This increases the weight and cost of the system as well as the possibility of failure due to the number of components.

Also, in the system of U.S. Pat. No. 4,717,000, the oil pressure in the accumulator during emergency operation is the same as the regulated air pressure to the nozzles. This means that the oil flow from the accumulator is dependent upon the regulated air pressure and the downstream conduits and orifices, and is sensitive to oil temperatures and variations in the pressure drop of the system. Thus the rate of oil flow from the accumulator during emergency operation is variable and cannot be assured to last for a predetermined desired period of time, i.e., about six minutes for an accumulator oil capacity of about 500 cc.

SUMMARY OF THE INVENTION

The preferred embodiment of the present invention provides a simplified integrated emergency lubrication system for a gas turbine engine comprising an emergency oil accumulator that is charged with oil by the engine's lubrication system, and which is associated with a proximate flow control valve and misting chamber connected to a single downstream oil/air mist lubrication conduit to each of the gearboxes serviced by the system. The accumulator includes a cylinder within which an ejection piston is movably housed. Compressed air, from a high pressure stage of the gas turbine engine's compressor section, communicates with an oil pressure activated valve that is normally held in a closed position by the oil pressure of the engine's main lubrication system. Should that system fail and the pressure of the oil fall as a result, the oil pressure activated valve opens and admits compressed air directly to the emergency system along two paths. High pressure air flows directly along one path to the space behind the piston of the oil accumulator. Movement of the piston forces oil under high pressure from the accumulator, through a metering flow control valve, to the misting chamber to the lubrication conduit connected to the gearboxes and bearings requiring lubrication. Another portion of the high pressure air is regulated to a reduced pressure, which is within the capabilities of the cooling means of the air supply system, and directed along a second path to the misting chamber where it combines with a uniform metered volume of the oil from the accumulator to form an air/oil mist that is supplied to the lubricating conduit to the gearboxes and sprayed over the bearings.

Since the compressed air leaves the compressor section of the engine at relatively high temperature, a conventional heat exchanger cooling means is provided to cool the air by dumping its heat to the engine's fuel flowing through the heat exchanger. This heat exchanger is part of the normal system heat exchanger and is available to cool the air as the oil cooling load is removed in the emergency mode.

An inlet check valve is provided on the accumulator to prevent a reverse flow of oil from the accumulator back to the engine's supply system in the event that the normal lubrication system fails, thereby isolating the emergency system from the engine's main oil system and permitting the emergency system to assume the function of lubricating the engine's bearings. In addition, a pressure-sensitive oil shut-off outlet valve is provided on the accumulator to prevent non-pressurized oil from leaking from the accumulator to the bearings while the engine's oil supply system is operating properly. As a further precaution, a hydraulic fuse is interposed between the engine's main oil supply system and the emergency system to block the connection between them in the event that the emergency system becomes damaged so that oil from the main lubrication system is not lost through a damaged emergency system.

Important distinctions between the present improved system and the emergency lubrication system of U.S. Pat. No. 4,717,000 include (a) a single downstream oil-/air mist mixing chamber located near or proximate a flow control valve from the oil accumulator for receiving a uniform metered volume of oil from the flow control valve and for receiving air under regulated pressure to produce a uniform oil/air mist; (b) a metering flow control valve for metering the oil from the accumulator to the misting chamber at a fixed rate, independently of the oil temperature and the upstream and downstream air pressures; (c) an air pressure regulator means associated with the high pressure air inlet valve means designed to divert the high pressure air between two paths, one path being directly associated with the oil accumulator to exert high air pressure upon the back of the discharge piston thereof, and the other path reducing the pressure of the air for supply to the mist generating or mixing chamber to which oil is uniformly metered by the flow control valve under emergency lubrication conditions, and (d) a common downstream lubricating conduit for supplying the oil/air mist from the mixing chamber to a plurality of gearboxes.

Both systems include an oil pressure-activatable air shut-off valve for admitting air to the air pressure regulator under emergency, low oil pressure conditions, and an oil flow control valve for isolating the normal lubrication system from the oil in the emergency oil accumulator. Also, in each case, the air pressure regulator serves to control the pressure of the air within the capabilities of the cooling means of the air supply system.

DESCRIPTION OF THE DRAWINGS

The invention is described in more detail below with particular reference to the attached drawings in which.

DESCRIPTION OF THE SCHEMATIC

Figure 1:
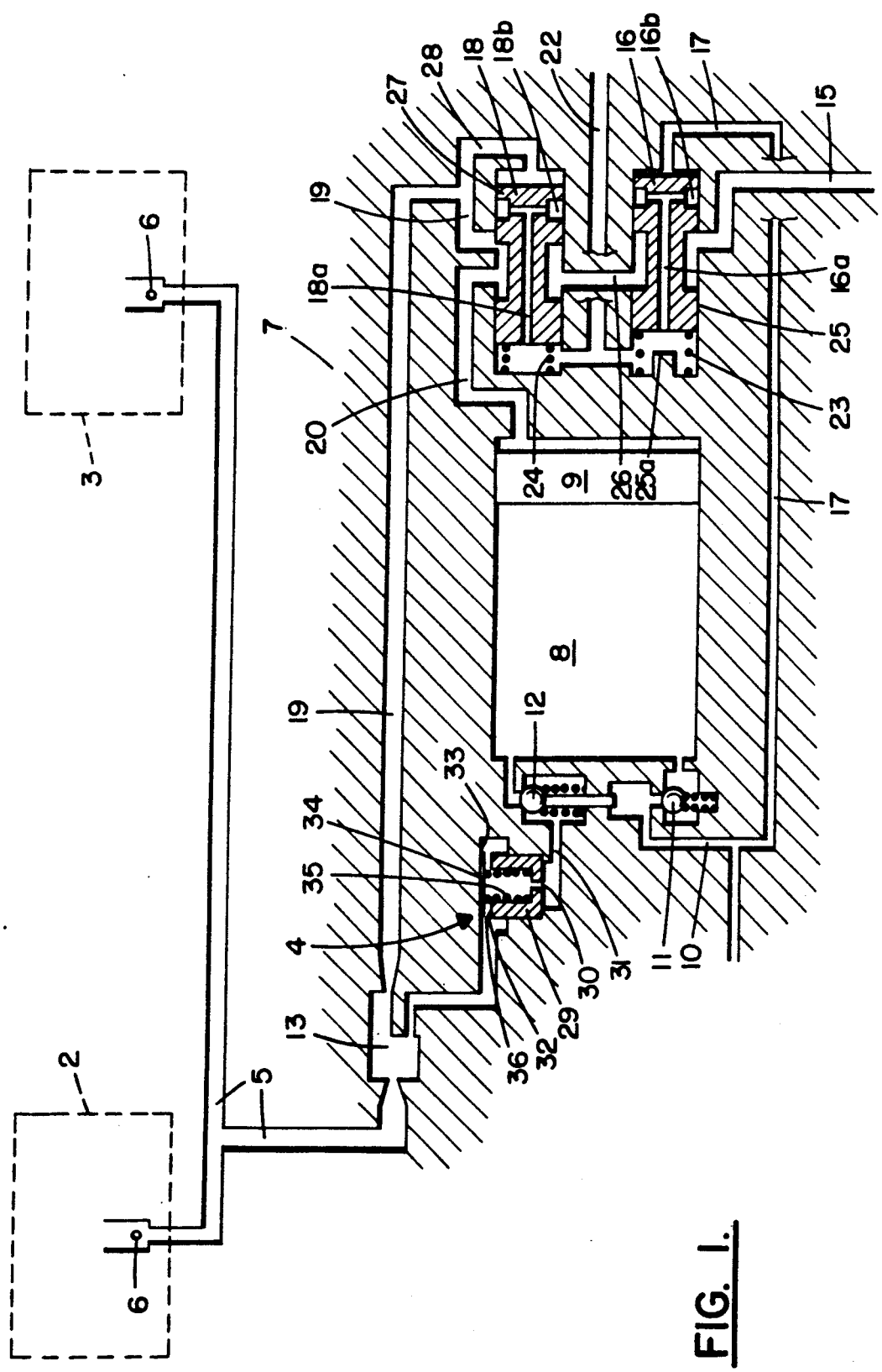
FIG. 1 is a schematic representation of the elements of the present emergency lubrication system during emergency operation.
Figure 2:
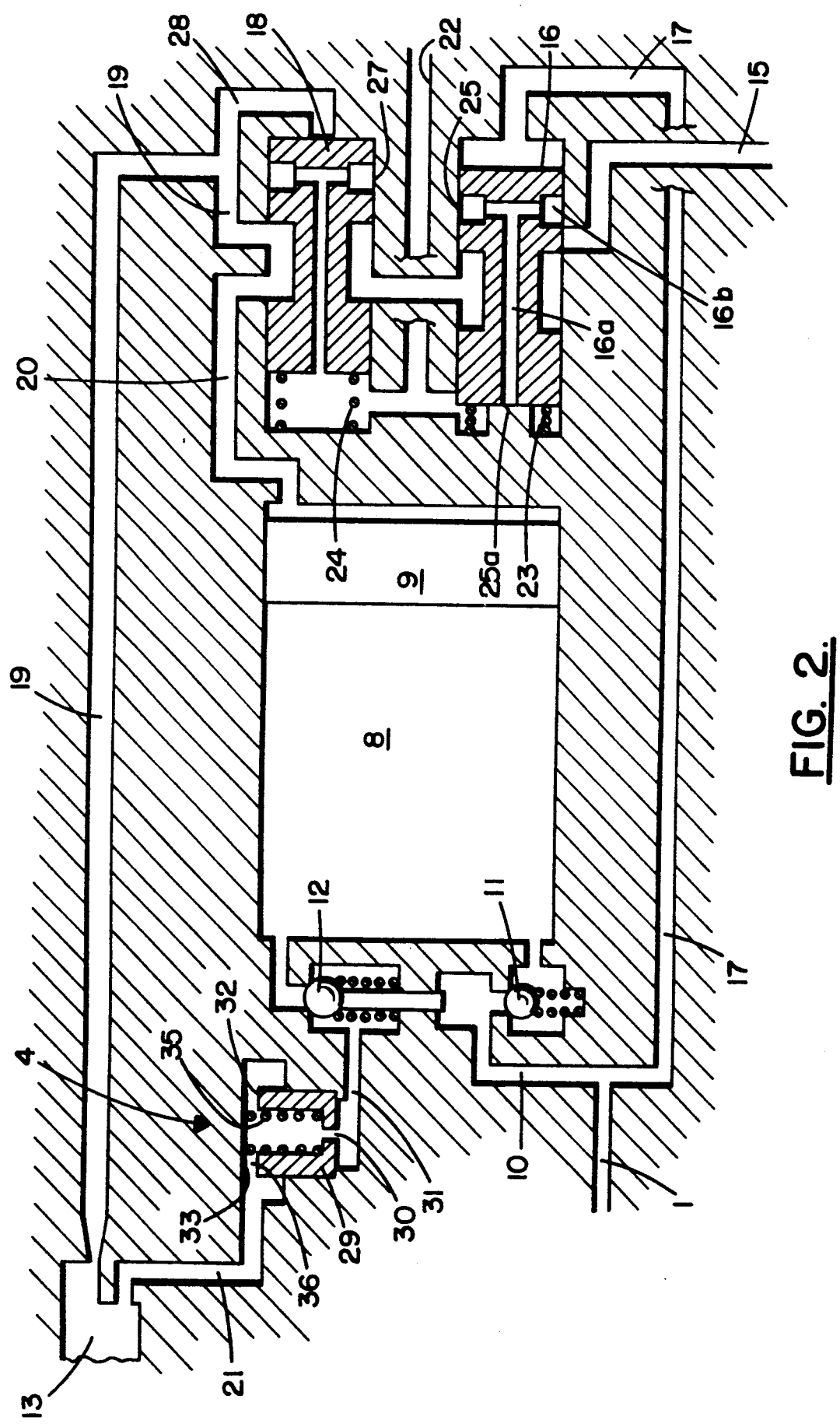
FIG. 2 is an enlarged view illustrating the positions of the air shut-off valve and the air pressure regulator valve of the apparatus of FIG. 1 during normal, non-emergency operation.

Reference numeral 1 of FIG. 1 indicates a branch of the normal lubricating oil supply line of a gas turbine engine (not shown) for supplying a metered oil/air mist under pressure to the engine's bearing assemblies, generally designated 2 and 3, and/or to an accessory gearbox, not shown. Conventionally, an oil pump, driven by the engine, pumps oil from a sump through a main oil supply line to effect lubrication. During initial start up, a portion of that oil is admitted past a hydraulic fuse into a branch 1 of the main oil line to fill oil conduits 10 and 17 of the emergency lubrication system of the present invention. As illustrated by FIG. 2 of the drawings, normal high oil pressure through conduit 17 to the rear of an air shut off spool valve 16 moves the spool valve 16 to the left to close a high pressure air inlet conduit 15 so that no air is admitted to the system during normal operation after initial start up and build-up of the normal oil pressure.

The normal high oil pressure to oil conduit 10, during start up, opens inlet check valve 11 to admit a supply of reserve oil into the oil accumulator 8, pushing the piston 9 to the right side position, illustrated by FIG. 2, until the accumulator 8 is filled with oil. The accumulator 8 is also provided with a pressure-sensitive outlet shut off valve 12 which prevents oil from escaping from the accumulator 8 in the absence of air pressure exerted behind the piston 9 of the accumulator 8. When the emergency reserve system is filled the flow of oil to the oil conduit branch ceases, and oil is supplied directly to the bearings and gearboxes for normal lubrication through the a main oil lubrication conduit. In the absence of the present system, in the event that the main oil supply line, pump or other elements of the normal lubricating system should be damaged or fail for any reason, the various bearings of the engine would immediately be starved for oil and catastrophic failure of the engine would occur almost immediately with obvious dire consequences. The present integrated emergency lubrication system, generally designated 7 in FIG. 1, is designed to cope with such a situation and to assure uninterrupted lubrication of the bearings and continued safe operation of the engine for six minutes or more at 85% of maximum rated power. During that time, the engine's operator can reduce power to the engine and take other appropriate emergency measures.

The emergency lubrication system of the present invention includes an emergency oil accumulator, generally designated 8, housing a movable piston 9. When the engine is first started, oil flows through the branch of the supply line, and through conduit 10, the pressure of the oil pushing pressure-sensitive inlet check valve 11 off its seat and forcing reserve oil into the accumulator 8 where it is stored for use in lubricating the bearing compartments 2 and 3 in the event that an emergency should arise. As the oil enters the accumulator, piston 9 is forced to its extreme right hand position as shown in the schematic. As will be described shortly, the piston 9 can be forced to the left to displace the oil from the accumulator 8 and eventually to the bearings 2 and 3 requiring lubrication during an emergency period.

Accumulator 8 includes a pressure-sensitive oil outlet shut off and check valve, generally designated 12. That valve is normally held in a closed position thereby preventing oil from flowing out of the accumulator 8 during normal operating conditions. However, if the pressure of the oil in the oil conduit branch 1 falls, as during an emergency situation, high air pressure is introduced behind piston 9, moving it to the left, and valve 12 will be opened by the oil pressure, permitting oil from the accumulator 8 to flow through flow control valve 4 to a misting chamber 13 for mixing with air prior to release through the lubrication conduit 5 to the bearing assemblies 2 and 3.

The energy for moving piston 9 towards the left during emergency operation is derived from compressed air bled from a high pressure stage of the engine's compressor section, not shown, through air inlet conduit 15. Since the air leaving the compressor may be at 200 psi and as hot as 800° F., it is cooled in a heat exchanger, through which flows cold engine fuel, before flowing through conduit 15 to an oil pressure activated spool valve, generally designated 16. That valve is normally held in a closed position against spring 23 and stop member 25a, as shown in FIG. 2, by the pressure of the oil in oil conduit branch 1 which is in fluid communication with the valve via conduit section 17. When the pressure in oil conduit branch 1 falls, as during failure of the engine's main lubrication system, valve 16 is forced open, as shown in FIG. 1, to admit compressed air from conduit 15 to a pressure regulating valve generally designated 18, which diverts the air between two paths. Valve 18 reduces the pressure of the air to a desired level before it is admitted to conduit 19 connected to the misting chamber 13, while admitting non-regulated, high pressure air through conduit 20 to the rear side of the piston 9 in the accumulator 8. The high pressure of the air, acting on the right end of piston 9, gradually forces it to the left thereby displacing oil from the accumulator 8 through the outlet valve 12, flow control valve 4 and conduit section 21 to the mist mixing chamber 13. Regulated compressed air from conduit 19 also combines with the oil introduced from conduit section 21 through a jet orifice into chamber 13 to form an air/oil mist that is fed through common conduit 5 to the various bearings assemblies such as 1 and 2, providing lubrication for them, through mist nozzles 6, as long as the emergency oil supply in the accumulator 8 lasts. The flow control valve 4 provides the correct metered flow of emergency oil to the misting chamber irrespective of the upstream and downstream pressures or temperatures of the oil. Thus the accumulator 8 can be subjected to any pressure greater than the regulated air pressure and yet the oil flow from the accumulator will be metered, i.e., about 80 cc/min. which assures that an accumulator oil capacity of about 500 cc will always last about 6 minutes during emergency operation.

Referring to the air supply system, as controlled by the air shut-off valve 16 and the air pressure regulator valve 18, during normal operation the lubrication oil pressure is sufficiently high to force the valve 16 against the bias of spring 23 to the air shut-off position shown in FIG. 2. In such position, no air is admitted through air conduit 15, and the air pressure regulator valve 18 is retained by spring 24 in the position shown in FIG. 1. Air forced out of the accumulator 8 behind piston 9 during initial start up bleeds back through conduit 20 and into conduit 19.

At this stage, shown by FIG. 2 the accumulator 8 is filled with reserve oil and the air inlet conduit 15 is sealed off by the oil-pressure sensitive spool valve 16. Thus the reserve oil in accumulator 8 is isolated from the normal oil supply and available for emergency use.

FIG. 1 illustrates the positions of the spool valves 16 and 18 in the emergency mode, as produced by a substantial reduction or loss of oil pressure in conduits 10 and 17 which are normally supplied with lubricating oil from the pressurized main oil supply conduit. When the oil pressure in conduit 17 decreases substantially or is lost completely behind the air spool valve 16, valve 16 is pushed to the right by means of spring 23 to open the air supply conduit 15 and admit air under high pressure into the air valve cylinder 25 housing spool valve 16, and through connecting conduit 26 into the regulator cylinder 27 housing regulator spool valve 18. This exerts full high pressure air through the regulator cylinder 27 and air conduit 20 to the rear of the accumulator piston 9 to force the reserve oil from accumulator 8 through the outlet valve 12 to the flow control valve 4 and into the misting chamber 13 through a jet inlet thereof for atomization with the regulated air introduced through air conduit 19.

The spring biased air pressure regulating spool valve 18 admits air to air conduit 19 until a sufficient pressure develops therein to exert a back pressure against the right side of the regulator spool valve 18 in cylinder 27 through air conduit section 28, moving valve 18 to the left against spring 24 to an intermediate position to restrict the opening to air conduit 19 any time that the air pressure within conduit 19 approaches full air pressure, while leaving air conduit 20 open at all times to maintain full air pressure to the accumulator 8.

It will be understood that the regulated air pressure within conduit 19 to the misting chamber 13 is relieved through the chamber 13 during emergency operation as the air and reserve oil, metered through the flow control valve 4, are mixed therein into a mist which is forced through the lubrication conduit 5 to the mist nozzles 6 in bearing compartments 2 and 3 to lubricate the bearings therein during emergency operation. Thus, the regulator spool valve 18 moves within its cylinder 27 to seek the position shown in FIG. 1. Thus the pressure of the air through conduit 19 to the misting chamber 13 is regulated within the tolerances of the air supply system, including the cooling means thereof. However air under full high pressure is continuously maintained to the accumulator during emergency operation since conduit 20 is always open as illustrated by FIGS. 1 and 2.

A downstream hydraulic fuse is provided downstream of supply branch line 1 and conduits 10 and 17. Should the emergency lubricating system itself fail, as by developing an oil leak, the hydraulic fuse blocks the flow of oil to the supply branch line 1 to conduits 10 and 17, leaving the entire emergency lubricating system isolated from the engine's main lubricating system.

Integrated Configuration

The present accumulator 8 has a cylindrical housing, closed at its right end by a wall and at its left end by a cap. Piston 9 is closely fitted but movable within the housing, the interior of the cylindrical housing between end wall and the left face of the piston defining a volume within which a predetermined volume of reserve oil may be stored for emergency use in lubricating the engine's bearings.

During start-up, oil from the engine's main oil supply line passes the hydraulic fuse into branch line 1 flows through conduit section 10 to communicate with inlet check valve 11 and open the spring loaded plunger thereof. When the pressure of the incoming oil is sufficient, check valve 11 is forced open and oil flows through to the interior of accumulator 8, thereby forcing piston 9 to its extreme right hand position as shown in FIG. 1. The spring acting on the lower end of the plunger of an outlet shut-off valve 12, prevents discharge of the oil from the accumulator 8 under normal operating conditions.

Under conditions of normal engine operation, the accumulator 8 fills with oil after a few minutes during start-up, but cannot discharge that oil because the accumulator is not pressurized and valve 12 is held closed. However, if the pressure of the engine's oil supply should fall, the accumulator becomes pressurized and the force of the oil, acting against the plunger of valve 12 forces oil through valve 12 to the flow control valve 4 to the misting chamber 13 for atomization and supply to the bearing compartments 2 and 3.

Attention is now directed to the air control valve 16 and regulator valve 18 of FIGS. 1 and 2. It will be noted that the oil pressure activated valve includes a hollow spool valve 16 that can slide within cylinder 25. The pressure regulating valve also includes a hollow spool valve 18 that can slide within cylinder 27. As shown in FIG. 2, both spool valves are in the positions assumed before the gas turbine engine is started, the spool valves being forced to the right by associated springs 23 and 24. When the engine is started, valves 16 and 18 are temporarily in the emergency positions illustrated by FIG. 1, and oil flows under pressure from the engine's main supply line through branch line 1, through conduit 10 and check valve 11, to the interior of the accumulator 8, as has been described, and through oil conduit 17 into cylinder 25 and into the space adjacent to the right end of spool valve 16. The pressure of the oil overcomes the force of spring 23 and forces spool valve 16 towards the left, blocking the flow of compressed air through conduit 15 from the engine's compressor section to the pressure regulating valve 18 as illustrated by FIG. 2.

For reasons to be explained below, spool valve 16 has a central bleed hole 16a, extending from the left end of the spool valve to an intermediate section having transverse ports 16b. The spool valve 18 also has a similar central bleed hole 18a communicating with transverse or radial ports 18b.

When the gas turbine engine is started, valves 16 and 18 are in the positions shown in FIG. 1 for a few minutes. Oil under supply line pressure, typically 100 psi, opens check valve 11 and fills accumulator 8, thereby establishing an emergency oil supply. Under normal operating conditions, the oil is blocked from leaving the accumulator 8 by oil shut off and check valve 12 but does flow through oil conduit 17 to the right end of spool valve 16. The pressure of the oil forces the spool valve to the left closing off air inlet conduit 15 after a few minutes so that compressed air from the engine's compressor section, at a pressure up to about 200 psi or more, cannot flow from conduit 15, as shown by FIG. 2 which illustrates non-emergency or normal operation. Under those conditions of normal operation, the spaces at the left hand ends of spool valves 16 and 18 are vented to line 22, the pressure of the air in the vent line stabilizing at the pressure of the means to which it is connected. That pressure may be slightly above atmospheric pressure. The space behind piston 9 in accumulator 8 is not pressurized under these conditions. The regulator spool valve 18 is forced all the way to the right by its spring 24 and the air shut-off valve 16 is forced all the way to the left, against stop member 25a, by the oil pressure in conduit section 17.

If the oil supply system of the engine becomes inoperative, the pressure in supply line branch 1 immediately drops, thereby reducing the pressure acting on the end of spool valve 16. The reduced pressure causes the spool valve 16 to be moved to the position shown in FIG. 1 under the influence of spring 23. As the spool valve 16 shifts position, it uncovers conduit 15 permitting the flow of compressed air, i.e., about 200 psi, into valve cylinders 25 and 27.

Since cylinder 25 is in communication with cylinder 27 and conduit 20, the compressed air can flow directly into the space behind accumulator piston 9, thereby applying high air pressure to the right side of piston 9. The pressure causes the piston to move towards the left, thus displacing oil from the accumulator 8 through the oil shut off and check valve 12 to flow control valve 4.

The air pressure is also communicated to the right end of regulator spool valve 18 through conduit 19 and conduit branch section 28. The spool valve 16 moves slightly to the left when the pressure differential acting across it is sufficient to overcome the force of spring 24. When that occurs, spool valve 18 covers a larger portion of the entrance to conduit 19 as shown in FIG. 1, increasing the restriction of the air flow to conduit 19 and regulating only the pressure of the air therein and not the pressure acting on piston 9 since the entrance to conduit 20 remains fully open. In the preferred embodiment, spring 24 is proportioned so as to prevent initial movement of regulator spool valve 18 to the left position shown in FIG. 1 until the pressure differential from the right end of the spool valve 18 to the left end of said valve 18 is a predetermined value, e.g., about 30 psi, which is the value of the regulated pressure fed into conduit 19 regardless of the higher pressure of the supplied air.

Should any oil tend to leak past the end of spool valve 16, it flows to the interior 16a of the hollow spool valve through the radial bores 16b and eventually through the center of the valve to the air vent conduit 22. Such oil leakage provides lubrication for spool valves 16 and 18.

Should the pressure of the air in conduit section 28 acting on the right end of spool valve 18 rise too high, due to a change in compression or pressure, spring 24 is compressed sufficiently to permit spool valve 18 to move to the left a small distance to further restrict the opening to conduit 19 and reduce the volume of pressurized air admitted thereto, thereby reducing the air pressure in conduit 19 and branch section 28.

The flow control valve 4 is an important element of the present system in that it provides a means for metering a uniform volume of oil, i.e., 80 cc/min., from the accumulator 8 to the misting chamber 13, regardless of the density or viscosity of the oil, which varies with temperature, and regardless of the upstream and downstream pressures. This assures that an accumulator having a capacity of 500 cc of oil will supply emergency oil for over 6 minutes.

As illustrated in FIG. 1, the flow control valve 4, supported within the outer housing, comprises a movable oil flow-regulating member in the form of a lower cylindrical cup 29 having a central axial orifice 30, cup 29 being vertically movable within its housing bore within the limits set by normal seating position, over an opening in conduit section 31 from the accumulator outlet valve 12, and elevated position in which the upper rim 32 of the cup 29 approaches the inside annular wall 33 of the cap member 34 of the valve 4. A spring 35 is positioned between the floor of the cup 29 and the roof of the cap member to depress the cup into seated position in the absence of oil flow within the conduit section 31, in which position the annular space 36 between the upper rim 32 of the cup 29 and the annular wall 33 of the cap member 34 is fully open to the conduit section 21 leading to the misting chamber 13. The flow control spring is proportioned to permit the flow of oil under emergency conditions at a predetermined flow rate, i.e., 80 cc/min. regardless of upstream and downstream pressures and temperatures. The high air pressure to the accumulator, during emergency operation, forces oil through conduit section 31, against the base of the cup, and through its orifice 30 to fill the cup. Pressure is relieved within the cup by the escape of oil through the annular space 36 into the conduit section 21. The spring 35 maintains the oil escape uniform by allowing the cup 29 to rise and narrow the annular space 36 whenever the oil flow in conduit section 31 becomes excessive, and by causing the cup 29 to lower and uncover more of the annular space 36 whenever the oil flow in conduit section 31 falls, thereby balancing the flow rate against the pressure drop through the orifice 30 at a predetermined value, e.g., about 80 cc/min. During emergency operation the cup 29 seeks a position in which oil flow through the valve 4 is at a predetermined rate, i.e., about 80 cc/min. with a constant pressure drop of about 10 psi across orifice 30.

Attention is now directed to FIG. 1 showing conduit 19 which conveys regulated compressed air, i.e. at about 30 psi, to the misting chamber 13. The end of the conduit 19 enters the misting chamber 13 and is merged therein with the nozzle end of oil conduit 21 which sprays the emergency oil supply from the accumulator 8. The air, passing at high velocity into the misting chamber 13 mixes with the oil spray and generates a mist of air and oil which is forced through a common lubrication conduit 5 to mist nozzles 6 in each of the gearbox assemblies from which it is sprayed over the bearings. It has been found that a mixture of 10 standard cubic feet of air per minute, mixed with 10 cc/min. of oil, provides adequate lubrication when the engine is operating at maximum rated power.

The use of a single common lubrication conduit 5 between the misting chamber 13 and each of the gearbox assemblies reduces the weight and cost of the present system compared to that of U.S. Pat. No. 4,717,000. More importantly, the maintenance of a uniform high air pressure to the oil accumulator piston 9 at all times during emergency operation assures a continuous supply of reserve oil to the flow control valve 4 and misting chamber 13 independently of the regulated reduced pressure of the air through conduit 19.

It will be apparent to those skilled in the art that other flow control structures can be designed and used in place of valve 4, the basic requirement being a means for metering a uniform supply of oil between a high pressure, e.g., about 200 psi, upstream conduit and lower pressure, e.g., about 30 psi, downstream conduit, so that the oil volume remains constant regardless of variations in the extent of the pressure drop and regardless of the temperature and viscosity of the oil.

From the foregoing description, it will be understood that the present invention provides a simplified integrated emergency lubrication system that will preserve the integrity of a gas turbine engine for a substantial time after the engine's oil supply system fails. The components of the system can be built as a compact integral assembly, protecting them from destructive forces far more effectively than would be possible if they were separate and located at various places about the engine. Further, the integral assembly can be produced at a cost below that of a plurality of separate components.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

We claim:

1. An integrated emergency lubricating system for supplying an oil/air mist to a lubrication conduit associated with bearings in the event that the supply of lubricating oil to said bearings through a main oil supply line fails, said system comprising:

(a) an oil accumulator for containing a fixed amount of emergency supply oil, said accumulator containing an oil inlet conduit section having a pressure-sensitive inlet valve communicating with a pressurized main oil supply line adapted to supply said fixed amount of emergency supply oil to said accumulator, an oil outlet conduit having a pressure-sensitive outlet valve for retaining said oil within the accumulator under non-pressurized conditions, and an air inlet conduit for admitting pressurized air under emergency conditions to pressurize the oil within the accumulator sufficiently to force it through said oil outlet valve and said outlet conduit;

(b) a misting chamber having an upstream oil inlet conduit section for supplying oil thereto from said accumulator under emergency conditions and an upstream air inlet conduit for supplying air to said misting chamber under emergency conditions to produce therein an oil/air mist with said oil, and having a downstream lubrication conduit for supplying said mist to one or more bearings requiring emergency lubrication;

(c) an air supply conduit having an outlet for admitting compressed air from a source to said system under emergency conditions;

(d) an air shut-off valve communicating with said air outlet and with an oil conduit section which communicates with the main oil supply line, said air shut off valve being biased to open said air outlet during emergency operation but being movable to close said air outlet during normal operating conditions by oil pressure within said oil conduit section;

(e) an air conduit section communicating with said air shut-off valve and with said air inlet conduit to the accumulator for conveying high pressure air directly to the accumulator when said air shut-off valve is in open position, and also communicating with a pressure-regulating means which is open to the air inlet conduit to said misting chamber, for supplying air under regulated pressure to said misting chamber when said air shut-off valve is in open position; and (f) an oil flow-control valve communicating with said oil outlet conduit from said accumulator and with said oil inlet conduit section to said misting chamber, for uniformly metering the flow of oil from the accumulator to the misting chamber independently of differences between the oil pressure from said accumulator to said oil outlet conduit and the oil pressure in said oil inlet conduit section and independently of the temperature and viscosity of said oil, whereby a uniform volume of emergency oil is automatically metered through said flow control valve, to said misting chamber under the effects of full pressurized air, and a regulated supply of air is supplied to said misting chamber whenever the pressure of the oil to said air shut-off valve fails.

2. A system according to claim 1 in which said accumulator comprises an oil compartment communicating with said oil inlet valve, and an air compartment communicating with said air inlet conduit, and a movable piston means separating said compartments.

3. A system according to claim in which said pressure-regulating means comprises a spool valve movable within a cylinder, said spool valve having an open central air passage area which adjustably communicates with a first opening to said air inlet conduit to the misting chamber, depending upon the movable position of the spool/valve within its cylinder, one end of said cylinder communicating with another opening to said air inlet conduit to pressurize said end of the cylinder and adjust the position of the spool valve to restrict the size of the first opening and thereby regulate the air pressure in said air inlet conduit to the misting chamber.

4. A system according to claim 1 in which said air shut-off valve comprises a spool valve movable within a cylinder, said spool valve having an open central air passage area which communicates with said air outlet when said spool valve is biased to one end of said cylinder during emergency operation, said end of the cylinder communicating with said oil conduit section to move said spool valve to the other end of the cylinder and close said air outlet in the presence of a pressurized oil supply in said oil conduit section.

5. A system according to claim 1 in which said oil flow-control valve comprises a pressure-sensitive flow-regulating member associated with a downstream outlet of said valve, said member being movable to vary the size of said outlet in response to upstream and downstream oil pressures, whereby the rate of oil flow through said flow control valve is maintained virtually constant during emergency operation.

6. A system according to claim 5 in which said flow control valve includes a spring means associated with said flow-regulating member and proportioned to apply an upstream force against said member sufficient to permit a predetermined desired oil flow rate through said flow control valve during emergency operation.

7. A system according to claim 1 in which the upstream oil inlet conduit to said misting chamber comprises a nozzle for spraying oil from said oil inlet conduit into said misting chamber for atomization with the regulated air admitted to said misting chamber from said emergency operation.

* * * * *